P. JONESKU.

IRONING AND PRESSING MACHINE.

APPLICATION FILED DEC. 6, 1910.

Reissued Mar. 21, 1911.

13,220.

Witnesses
Milton Senoir
E. M. Klatcher

Inventor
Peter Jonesku
By Gilson & Gilson
Attorneys.

UNITED STATES PATENT OFFICE.

PETER JONESKU, OF CHICAGO, ILLINOIS.

IRONING AND PRESSING MACHINE.

13,220. Specification of Reissued Letters Patent. Reissued Mar. 21, 1911.

Original No. 973,789, dated October 25, 1910, Serial No. 576,984. Application for reissue filed December 6, 1910. Serial No. 595,985.

*To all whom it may concern:*

Be it known that I, PETER JONESKU, a subject of King Carl of Roumania, residing at Chicago, in the county of Cook and State of Illinois, have invented certain new and useful Improvements in Ironing and Pressing Machines, of which the following is a specification.

My invention relates to an improvement in ironing and pressing machines, but more particularly to the mechanism employed for moving the swinging iron into pressing engagement with the buck.

The principal object of my invention comprehends the production of a device of the above character, in which the mechanism above referred to is actuated to bring the iron in operative position, by means of fluid pressure and when so actuated, the mechanism will lock, to keep the pressure on the iron uniform; and which will also automatically return to normal position when the pressure is released.

Other objects and their resultant advantages will become apparent as the nature of my invention becomes better understood from the following description and accompanying drawing, in which—

Figure 1:
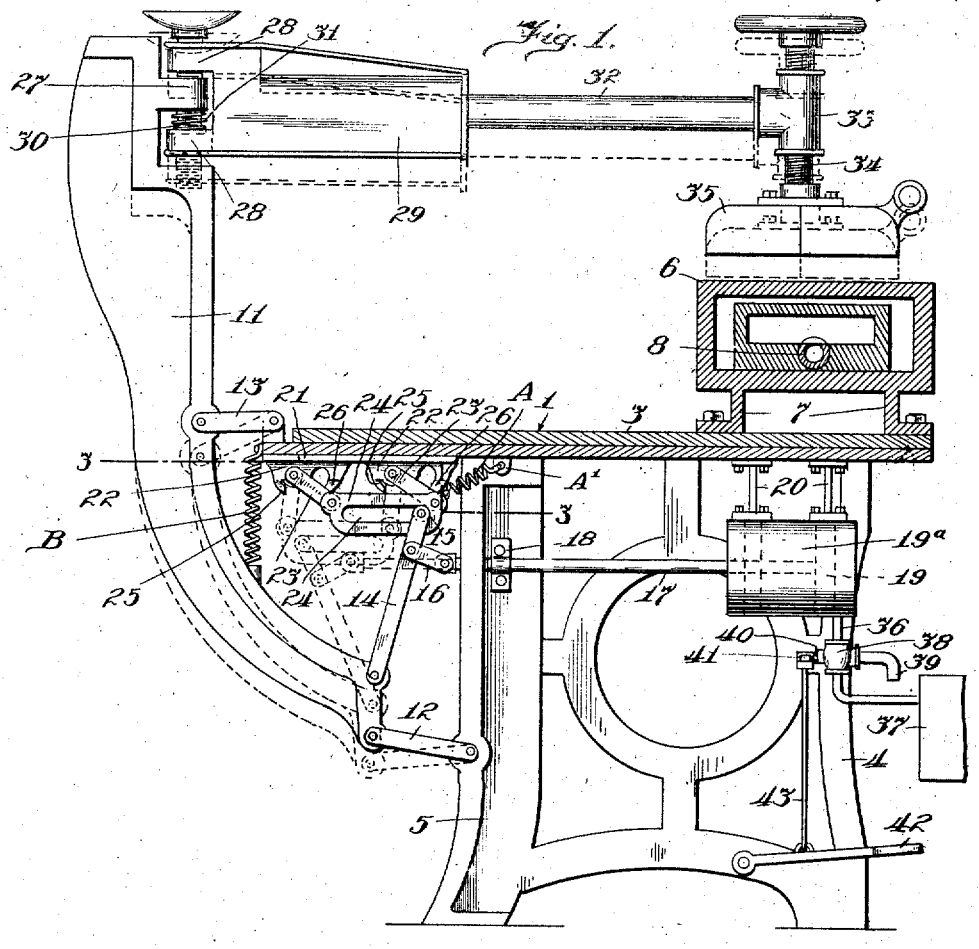
Figure 3:
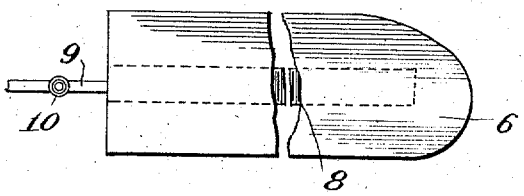
Figure 2:
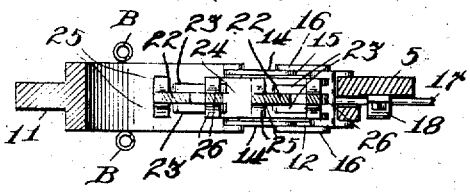

Figure 1 is a transverse sectional view showing the parts in normal position, and illustrating by dotted lines, the position of the parts in operative position; Fig. 2 is a horizontal sectional view taken on the line 3—3 of Fig. 1, looking down; Fig. 3 is a detail of the burner for the buck.

Reference being had to the drawing and the numerals indicated thereon, 1 indicates the table of the machine, which comprises a top 2, a wooden table board 3, end lugs 4, and an intermediate leg 5.

Mounted longitudinally upon the table there is shown a buck 6 comprising a hollow body having depending legs 7. A gas burner 8 is disposed within the buck 6 and receives fuel through a pipe 9, which is provided with a suitable valve 10.

The movable standard of the machine is indicated at 11. The standard 11 is located at the rear of the table on a line with the intermediate leg 5 and is pivotally connected at its lower end to the said intermediate leg 5, by means of spaced links 12, and to the table 1 by means of similar links 13. Pivotally connected to the standard 11, near its lower end, are the lower ends of spaced operating arms 14, between the upper ends of which is mounted a roller 15. Pivotally mounted on the arms 14, near their upper ends, are the outer ends of links 16, the inner ends of which are pivotally connected to the front end of a piston rod 17. The piston rod 17 is slidably mounted in a bracket 18 fixed to the leg 5 and has its inner end provided with a piston head 19 which works in a cylinder 19ª fixed to the under side of the table 1 by means of brackets 20.

Mounted on the under side of the table 1 rearwardly of the leg 5 is a casting 21 which is formed with downwardly extending lugs 22, to which are pivotally connected the upper ends of links 23. The lower ends of the links 23 are pivotally connected to the ends of a member 24. This member 24 is provided with a longitudinal slot 24ª in which the roller 15 of the operating arms 14 is adapted to travel, as will be hereinafter described. As shown most clearly in Fig. 1 the rear ends of the lugs 22 extend below the pivot point of the links 23 and are widened as at 25 to form stops. The front ends of the lugs 22 also extend below the pivot point of the links 23 and are formed with widened extremities to form stops 26. It will thus be seen that the swinging movement of the links 23 is limited by the stops 25 and 26, that is, when the parts are in normal position the links 23 will engage the stops 26, and when in operative position they will engage the stops 25. A coil spring A, fastened at one end to the front end of the member 24 and at its other end to a suitable bracket A′ fixed to the under side of the table, serves to return the member 24 to normal position, as will be hereinafter described.

The standard 11 has a portion at the upper end thereof cut away to form a boss 27 through which, and similar bosses 28 formed on the inner end of a horizontally swinging arm 29, is passed a vertical pin 30 which has its lower end screwed into the standard 11. Coiled about the pin 30 between the boss 27 of the standard and the lower of the bosses 28 of the arm 29 is a spring 31, the purpose of which is to cushion the shock on the arm 29 when the same is brought to operative or pressing position. The arm 29 has adjustably mounted thereon a member 32 having at its outer end a T-coupling 33 in which is mounted the adjusting screw 34, the lower end of which is rotatably mounted on an iron 35, which may be of any desired type of structure.

At its front end, the cylinder 19ᵃ has connected therewith an air receiving pipe 36, receiving compressed air from a suitable reservoir 37. The pipe is provided with a three-way valve 38, one port of which forming communication between the reservoir 37 and the cylinder, and the other port forming communication between the cylinder and an exhaust pipe 39. The stem of the valve is indicated at 40 and is provided with an arm 41, which latter is turned, to open and close the valve, by means of a foot pedal 42 and the connecting rod 43.

In operation, clothes or the like to be pressed are placed upon the buck and the foot pedal moved down to operate the valve to allow air from the reservoir to enter the cylinder and force the piston forwardly. When this occurs the operating arms 14 will be caused to swing forwardly, its roller 15 working along the slot 24ᵃ of the member 24 and as the member 24 cannot move upwardly owing to the links 23 engaging the stops 26, this action of the operating arms 14 will cause the standard to move downwardly. When the roller 15 reaches the rear end of the slot 24ᵃ, the continued forward movement of the piston rod will cause the links 23, together with the member 24, to swing rearwardly until the links 23 engage the stops 25. This will cause the standard to be moved downwardly the balance of its distance, or until the iron 35 bears upon the clothes on the buck. The desired pressure may be attained by adjusting the screw 34. As shown in dotted lines in Fig. 1, when the links 23 engage the stops 25 they will be slightly beyond the dead center, thereby causing said links to lock and keep a steady pressure on the iron. As long as air remains in the cylinder 19ᵃ the parts will remain in operative position, and the arm 29 may be swung in a horizontal plane to move the iron over the clothes. When it is desired to release the iron from the buck, the valve is turned to close communication between the reservoir and cylinder and to permit air to be discharged through the exhaust pipe 39. When this occurs, the spring A will draw the member 24 forwardly, and as soon as the links 23 pass the dead center, the large springs B act to restore the parts to their normal position.

From the foregoing it will be seen that I provide an ironing and pressing machine having only a few operative parts, which will be strong and durable, and which will admirably serve the purpose for which it is intended.

I claim as my invention—

1. In an ironing machine, in combination, a supporting frame, a reciprocable iron-carrying standard, a toggle lever reacting between the frame and standard, the members of the toggle being connected by a sliding pivot, stops limiting the movement of one toggle member, and means for applying actuating pressure to the other toggle member.

2. In an ironing machine, in combination, a supporting frame, a vertically-movable standard, a swinging iron-carrying arm mounted upon the standard, a toggle lever reacting between the frame and the standard to lower the latter, the members of the toggle being connected by a sliding pivot, stops limiting the movement of one toggle member, and means for applying actuating pressure to the other toggle member.

3. In an ironing machine, in combination, a frame, a vertically reciprocating iron-carrying standard supported by the frame, a toggle lever reacting between the frame and the standard, one member of the lever comprising a pair of parallel links and a longitudinally slotted bar and the other member thereof being an arm having sliding pivotal engagement with the slot of the bar, means for limiting the oscillation of the links, and means for applying power to the arm member of the toggle lever.

4. In an ironing machine, the combination with a table, of a vertically movable standard having means to carry the iron, links connecting the standard and the table, a casting secured to the under side of the table, links pivoted at their upper ends to said casting, and a slotted member carried by said links, spaced operating arms pivoted at their lower ends to the lower end of said standard, and a roller journaled between the upper ends of said arms and adapted to work in the slot of the aforesaid member, and means for moving the operating arms rearwardly to swing the links to a perpendicular position and lower the standard, stops formed on the aforesaid casting to limit the movement of the links in both directions, certain of said stops being so arranged as to allow the links to swing slightly beyond the dead center when they are moved to perpendicular to lock the same, and means for returning the parts to normal position.

PETER JONESKU.

Witnesses:
LOUIS K. GILLSON,
HERMAN A. OTT.